US009323400B2

(12) United States Patent
Kim et al.

(10) Patent No.: US 9,323,400 B2
(45) Date of Patent: Apr. 26, 2016

(54) FLAT PANEL DISPLAY WITH INTEGRATED TOUCH SCREEN PANEL

(75) Inventors: Jong-Soo Kim, Yongin (KR); Do-Youb Kim, Yongin (KR); Myoung-Seop Song, Yongin (KR); Sang-Kyun Cho, Yongin (KR)

(73) Assignee: Samsung Display Co., Ltd., Gyeonggi-Do (KR)

( * ) Notice: Subject to any disclaimer, the term of this patent is extended or adjusted under 35 U.S.C. 154(b) by 376 days.

(21) Appl. No.: 13/021,581

(22) Filed: Feb. 4, 2011

(65) Prior Publication Data

US 2012/0062481 A1 Mar. 15, 2012

(30) Foreign Application Priority Data

Sep. 14, 2010 (KR) .................. 10-2010-0089955

(51) Int. Cl.
*G06F 3/044* (2006.01)
*G06F 3/041* (2006.01)

(52) U.S. Cl.
CPC ............. *G06F 3/044* (2013.01); *G06F 3/041* (2013.01)

(58) Field of Classification Search
CPC ............................................ G06F 3/041–3/047
USPC ................. 345/173; 178/18.03, 18.05, 18.06
See application file for complete search history.

(56) References Cited

U.S. PATENT DOCUMENTS 6,885,157 B1 *   4/2005  Cok et al. .................... 315/169.3
8,330,734 B2 * 12/2012  Oohira ......................... 345/173
2002/0171610 A1 * 11/2002  Siwinski et al. ................. 345/76
2002/0186208 A1 * 12/2002  Feldman et al. ............... 345/173
2004/0185301 A1 *  9/2004  Tsuchiya et al. .............. 428/690
2005/0051829 A1 *  3/2005  Goto et al. .................... 257/310
2005/0172722 A1 *  8/2005  Kobayashi et al. ............. 73/754
2007/0242055 A1    10/2007  Lai
2008/0116795 A1 *  5/2008  Tsuchiya et al. .............. 313/512
2010/0007616 A1 *  1/2010  Jang .............................. 345/173
2010/0033443 A1 *  2/2010  Hashimoto ................... 345/173
2010/0060601 A1 *  3/2010  Oohira ......................... 345/173
2010/0108409 A1 *  5/2010  Tanaka et al. ............... 178/18.06
2010/0214247 A1 *  8/2010  Tang et al. .................... 345/173
2010/0244073 A1 *  9/2010  Ito et al. ......................... 257/98
2010/0309150 A1 * 12/2010  Lee et al. ...................... 345/173
2011/0012845 A1 *  1/2011  Rothkopf et al. ............. 345/173
2011/0128240 A1 *  6/2011  Choi ............................. 345/173

FOREIGN PATENT DOCUMENTS

CN          1591876 A       3/2005
CN          1729719 A       2/2006
(Continued)

OTHER PUBLICATIONS

Chinese First Office Action dated Jul. 2, 2015 for Chinese Patent Application No. CN 201110059238.8 which shares priority of Korean Patent Application No. KR 10-2010-0089955 with captioned U.S. Appl. No. 13/021,581.

*Primary Examiner* — Dmitriy Bolotin
(74) *Attorney, Agent, or Firm* — Knobbe, Martens, Olson & Bear, LLP

(57) ABSTRACT

A flat panel display having an integrated touch screen panel directly formed on a sealing thin film is disclosed. In the display, sensing lines of the touch screen panel are formed to extend to a substrate of the display panel, on which organic light emitting elements are formed, so that the touch screen panel and the display panel are connected to a flexible printed circuit board, thereby simplifying manufacturing processes and decreasing product cost.

13 Claims, 3 Drawing Sheets

(56) References Cited

FOREIGN PATENT DOCUMENTS

| CN | 101626017 A | 1/2010 |
| CN | 101766055 A | 6/2010 |
| KR | 10-0873080 B1 | 12/2008 |
| KR | 10-2010-0007717 A | 1/2010 |

* cited by examiner

FLAT PANEL DISPLAY WITH INTEGRATED TOUCH SCREEN PANEL

CROSS-REFERENCE TO RELATED APPLICATIONS

This application claims priority to and the benefit of Korean Patent Application No. 10-2010-0089955, filed on Sep. 14, 2010, in the Korean Intellectual Property Office, the entire content of which is incorporated herein by reference.

BACKGROUND

1. Field

The disclosed technology relates to a flat panel display, and more particularly, to a flat panel display with an integrated touch screen panel.

2. Description of the Related Technology

A touch screen panel is an input device that allows a user's instruction to be inputted by selecting an instruction content displayed on a screen of a display or the like with a user's hand or an object.

To this end, the touch screen panel is formed on a front face of the display and is capable of converting a contact position into an electrical signal. The user's hand or object directly contacts the touch screen panel at the contact position. Accordingly, the instruction content selected at the contact position is inputted as an input signal to the display.

Since such a touch screen panel can be substituted for a separate input device connected to a display, such as a keyboard or mouse, its application fields have been gradually extended.

Touch screen panels may be categorized as a resistive overlay touch screen panel, a photosensitive touch screen panel, a capacitive touch screen panel, and the like. Among these touch screen panels, the capacitive touch screen panel converts a contact position into an electrical signal by sensing a change in capacitance formed between a conductive sensing pattern and an adjacent sensing pattern, ground electrode or the like when a user's hand or object is in contact with the touch screen panel.

Such a touch screen panel is generally attached to an outer surface of a flat panel display such as a liquid crystal display or organic light emitting display. In a case where a separately manufactured touch screen panel is attached to a flat panel display, the entire thickness of a product is increased, and manufacturing cost is increased.

In this case, a driving IC for a flat panel display and a driving IC for a touch screen panel are separate from the flat panel display and the touch screen panel, and therefore, it is difficult to achieve compatibility between products. Since the driving ICs are necessarily connected to separate flexible printed circuit boards (FPCBs), respectively, a manufacturing process is complicated, and product cost is increased.

SUMMARY OF CERTAIN INVENTIVE ASPECTS

Brief Description of the Drawings

The accompanying drawings, together with the specification, illustrate exemplary embodiments, and, together with the description, serve to explain various inventive aspects and principles.

DETAILED DESCRIPTION OF CERTAIN INVENTIVE EMBODIMENTS

Figure 1:
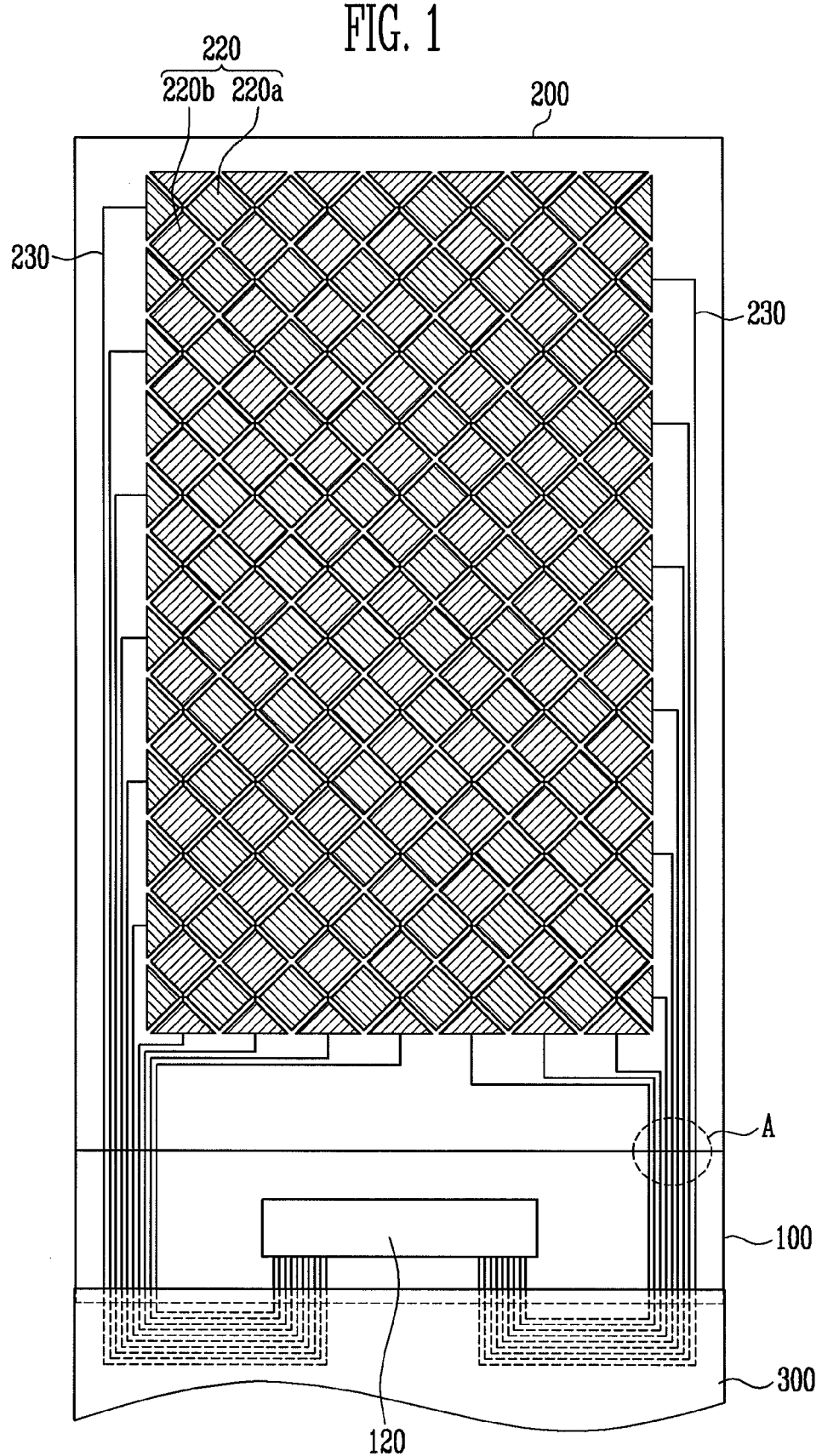
FIG. 1 is a plan view of a flat panel display with an integrated touch screen panel according to an embodiment of the present invention.

In the following detailed description, only certain exemplary embodiments have been shown and described. As those skilled in the art would realize, the described embodiments may be modified in various ways, without departing from the spirit or scope of the present invention. Accordingly, the drawings and description are to be regarded as illustrative in nature and not restrictive. In addition, when an element is referred to as being "on" another element, it can be directly on another element or be indirectly on another element with one or more intervening elements interposed therebetween. Also, when an element is referred to as being "connected to" another element, it can be directly connected to another element or be indirectly connected to another element with one or more intervening elements interposed therebetween. Hereinafter, like reference numerals generally refer to like elements.

Hereinafter, exemplary embodiments of the present invention will be described in detail with reference to the accompanying drawings.

Figure 2:
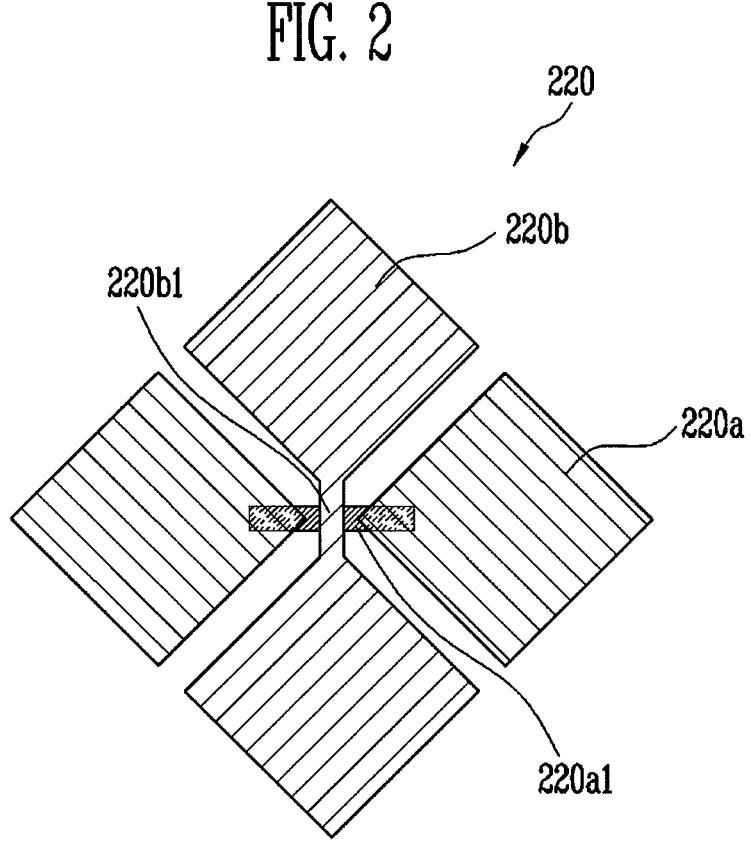
FIG. 2 is an enlarged view showing an embodiment of sensing cells shown in FIG. 1.

FIG. 1 is a plan view of a flat panel display with an integrated touch screen panel according to an embodiment. FIG. 2 is an enlarged view showing an embodiment of sensing cells shown in FIG. 1.

For convenience of illustration, some of the sensing cells are shown in FIG. 2. However, the touch screen panel has a structure in which the sensing cells shown in FIG. 2 are repeatedly arranged.

Referring to FIGS. 1 and 2, in the flat panel display with the integrated touch screen panel according to this embodiment, sensing cells 220 and sensing lines 230 for implementing the touch screen panel are formed on a sealing thin film 200 for sealing a plurality of pixels formed on a substrate 100.

In this instance, the flat panel display according to this embodiment is implemented as an organic light emitting display in which an organic light emitting element, a thin film transistor, and a capacitor are provided to each of the pixels.

Conventionally, in the organic light emitting display, a glass substrate having a cavity or plate pattern is joined with the substrate 100 under a vacuum atmosphere so as to prevent the organic light emitting elements from being exposed to moisture and oxygen.

However, the thickness of the glass substrate as a sealing substrate is large. Therefore, where a touch screen panel is formed on the glass substrate, it is disadvantageous because of the large thickness.

Accordingly, in this embodiment, the sealing thin film 200 including a pixel area of the substrate 100 is formed rather than the conventional sealing substrate for the purpose of protecting the organic light emitting elements, thereby minimizing thickness.

The sensing cells 220 include a plurality of first sensing cells 220a formed to be connected for each row line along a first direction, e.g., a column direction, and a plurality of second sensing cells 220b alternately arranged to not be overlapped with the first sensing cells 220a and formed to be connected for each column line along a second direction, e.g., a column direction, intersected with the first direction.

The sensing cells 220 are formed of a transparent electrode material such as indium tin oxide (ITO) so that light from a display panel disposed below the sensing cells 220 can be transmitted through the sensing cells 220.

As shown in FIG. 2, the first sensing cells 220a are connected to each other along each line in the first direction by a first connection pattern 220a1, and the second sensing cells 220b are connected to each other along each line in the second direction by a second connection pattern 220b1.

Here, the first connection pattern 220a1 and/or the second connection pattern 220b1 are patterned to have independent patterns, respectively. The first or second connection pattern 220a1 and 220b1 may be patterned to be directly/indirectly connected to the first or second sensing cells 220a or 220b, or to be integrally connected to the first or second sensing cells 220a or 220b from a process of patterning the first and second sensing cells 220a and 220b.

For example, the first connection patterns 220a1 are respectively patterned to have independent patterns in an upper or lower layer of the first sensing cells. The first connection patterns 220a1 connect the first sensing cells 220a to one another for each line along the first direction while being electrically connected to the first sensing cells 220a at an upper or lower portion of the first sensing cells 220a.

The first connection patterns 220a1 may be formed of a transparent electrode material such as ITO like the sensing cells 220, or may be formed of a low-resistance opaque metallic material like the sensing lines 230. The width of the first connection patterns 220a1 may be adjusted to prevent them from affecting the visual quality of the display.

The second connection patterns 220b1 may be integrally patterned with the second sensing cells 220b so as to connect the second sensing cells 220b to one another along each line in the second direction from a process of patterning the sensing cells 220.

In this instance, an insulating layer (not shown) for ensuring electrical isolation is interposed between the first connection patterns 220a1 and the second connection patterns 220b1.

The sensing lines 230 are used to connect the sensing cells 220 to a driving circuit for each line along the first or second direction. The sensing lines 230 are arranged in a non-touch active area formed at the outside of a touch active area. Here, the touch active area is an area corresponding to the pixel area of the display panel.

For example, the sensing lines 230 are electrically connected to row lines of the first sensing cells 220a and column lines of the second sensing cells 220b, respectively, so as to be connected to the driving circuit (not shown) of the touch panel, such as a position detecting circuit.

An edge pattern (not shown) such as a black matrix of a window (not shown) may be positioned on the sensing lines 230. Thus, it is possible to prevent the sensing lines 230 from being seen, so that the material of the sensing lines 230 is selected from a large variety of options. For example, the sensing lines 230 may be formed of not only a transparent electrode material used to form the sensing cells 220 but also a low-resistance metallic material such as molybdenum (Mo), silver (Ag), titanium (Ti), copper (Cu), aluminum (Al) or Mo/Al/Mo.

In this embodiment, as shown in FIG. 1, the sensing lines 230 extend to the substrate 100 of the display panel from an end of the sealing thin film 200 so as to be electrically connected to a flexible printed circuit board (FPCB) 300 attached to the substrate 100.

This can be implemented because the thickness of the sealing thin film 200 is sufficiently thin. Particularly, an end portion A of the sealing thin film 200 is formed to be inclined (see FIG. 3), so that it is possible to prevent the sensing lines passing over the end portion from being broken. Hereinafter, this will be described in detail with reference to FIG. 4.

In this instance, the FPCB 300 is electrically connected a driving IC 120 for driving a plurality of pixels (not shown) in the pixel area of the display panel. Accordingly, in this embodiment, the touch screen panel and the display panel use only one FPCB. The driving circuit of the touch panel, which drives the touch screen panel, may be integrated on the driving IC 120.

The touch screen panel configured as described above is a capacitive touch screen panel. If a contact object such as a user's finger or stylus pen comes in contact with the touch screen panel, a change in capacitance caused by a contact position is transferred from the sensing cells 220 to the driving circuit (not shown) via the sensing lines 230. Then, the change in capacitance is converted into an electrical signal by X and Y input processing circuits (not shown), thereby detecting the contact position.

Figure 3:
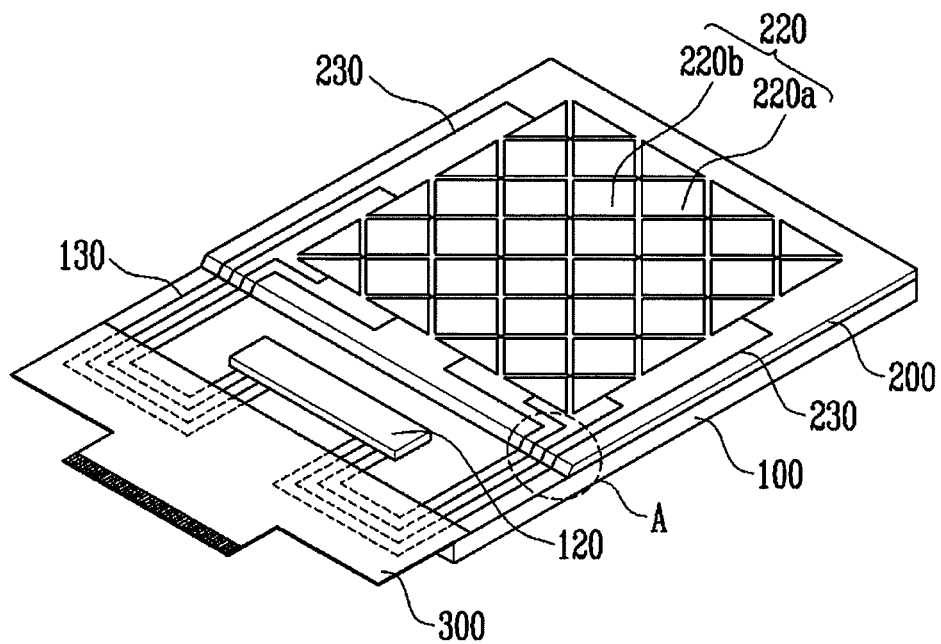
FIG. 3 is a perspective view of a flat panel display with an integrated touch screen panel according to an embodiment of the present invention.
Figure 4:
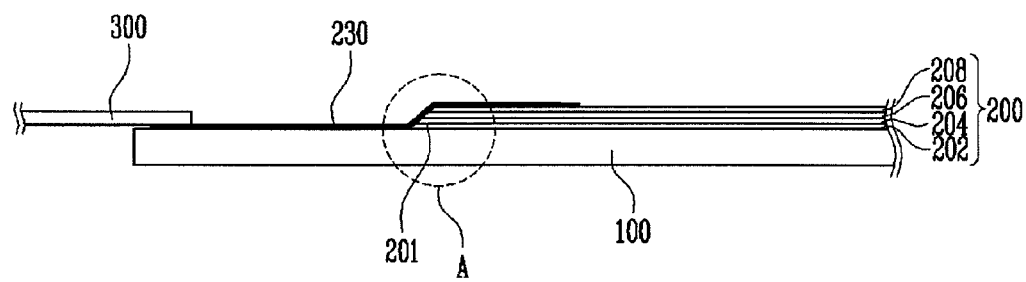
FIG. 4 is a schematic sectional view showing a region including specific portion A of FIG. 3.
Figure 5:
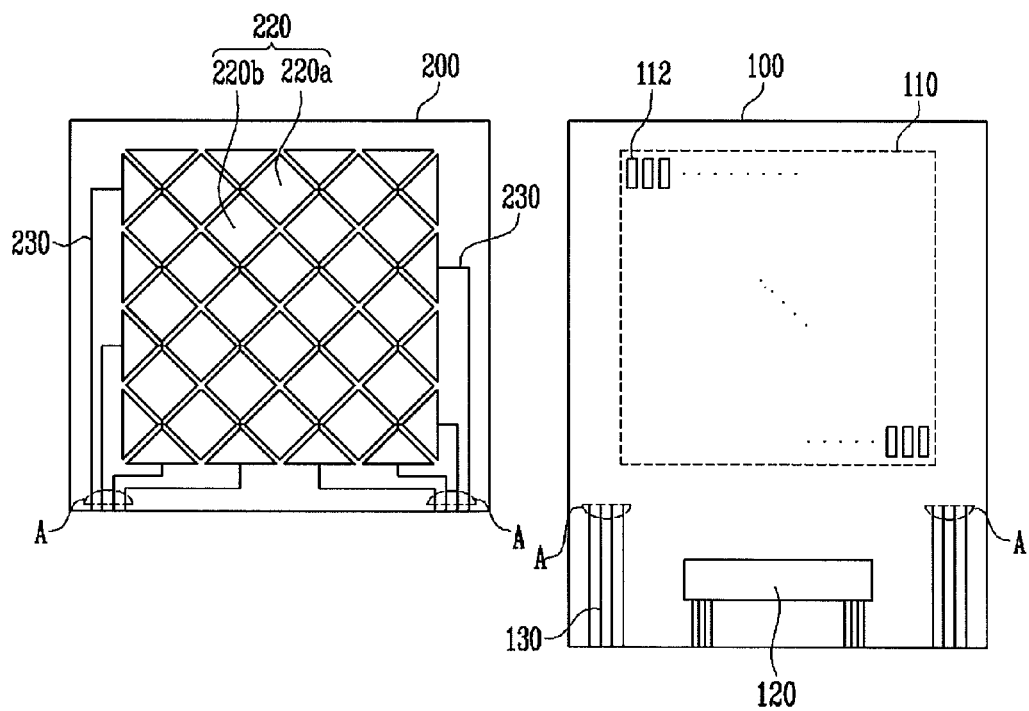
FIG. 5 is a set of separate plan views showing a sealing thin film and a substrate shown in FIG. 3.

FIG. 3 is a perspective view of a flat panel display with an integrated touch screen panel according to an embodiment. FIG. 4 is a separate plan view showing a sealing thin film and a substrate shown in FIG. 3. FIG. 5 is a schematic sectional view showing a region including specific portion A of FIG. 3.

Referring to FIGS. 3 to 5, this embodiment is a flat panel display with an integrated touch screen panel, in which sensing cells 220 and sensing lines 230 for implementing the touch screen panel are formed on a sealing thin film 200 for sealing a plurality of pixels 112 formed on a substrate 100.

Here, the flat panel display according to this embodiment is implemented as an organic light emitting display in which an organic light emitting element (not shown), a thin film transistor (not shown) and a capacitor (not shown) are provided to each of the pixels 112.

That is, touch sensing patterns including the sensing cells 220 and the sensing lines 230 are formed on the top surface of the sealing thin film 200 formed on the substrate 100 including a pixel area 110 so as to seal the pixel area 110 in which the pixels 112 are formed.

In this instance, the sensing cells 220 are formed in an area overlapped with the pixel area 110, and the sensing lines 230 are formed in an area corresponding to the outside of the pixel area 110.

In this embodiment, the sensing lines 230 extend to the substrate 100 of the display panel via an end portion A of the sealing thin film 200, so as to be electrically connected to the FPCB 300 attached to one end of the substrate 100.

This can be implemented because the thickness of the sealing thin film 200 is sufficiently thin. Particularly, the end portion A of the sealing thin film 200 is formed to be inclined, so that it is possible to prevent the sensing lines passing through the end portion from being broken.

The sealing thin film 200 is formed to protect the organic light emitting element provided to each of the pixels 112, and may be implemented as a stacked structure of a plurality of organic and inorganic layers.

More specifically, referring to FIG. 4, the sealing thin film 200 may be formed as, for example, a structure in which a first organic layer 202, a first inorganic layer 204, a second organic layer 206 and a second inorganic layer 208 are alternately stacked so as to effectively block oxygen and moisture from the exterior.

The first and second organic films 202 and 206 of the sealing thin film 200 prevents nano-crack and micro-crack defects formed in the first and second inorganic layers 204 and 208 from being continuously formed, so that it is possible to decrease a moisture transmission rate by preventing an infiltration path of moisture and oxygen and to reduce stress left in the first and second organic layers 204 and 208.

In this instance, the first and second organic layers 202 and 206 may be formed of one selected from the group consisting of epoxy, acrylate and urethane acrylate. The first and second inorganic layers 204 and 208 may be formed of one selected from the group consisting of $Al_xO_y$ and $Si_xO_y$.

Although the sealing thin film 200 is implemented as a stacked structure of four layers, the thickness of the sealing thin film 200 can be implemented to be considerably thinner than that of the conventional sealing substrate, i.e., the conventional glass substrate.

Thus, the sensing lines 230 formed on the sealing thin film 200 can be formed to run over the sealing thin film 200 and the substrate through a process such as the same photolithography process as shown in these figures.

However, a risk exists that the sensing lines 230 that pass through the end portion A of the sealing thin film 200 may be broken by the step difference of the end portion in the patterning process.

Accordingly, in this embodiment, an area 201 of the end portion of the sealing thin film 200 is formed to be inclined as shown in FIG. 4, thereby overcoming such a problem.

That is, the sensing lines 230 extend to the substrate 100 of the display panel via the end portion A of the sealing thin film 200, so as to be electrically connected to the FPCB 300 attached to the one end of the substrate 100.

In this instance, the sensing lines 230 may also be connected to a driving IC 120 of the display panel via the FPCB 300. The driving IC 120 may include a control circuit for driving the touch screen panel, a position detecting circuit, or the like as well as a control circuit for driving the display panel.

Accordingly, the touch screen panel and the display panel share only one FPCB 300 with each other. The FPCB 300 is connected to an end of the substrate 100 (an end at which a pad portion (not shown) is formed) so as to be electrically connected to driving lines (not shown) of the display panel. Thus, the FPCB 300 can supply a control signal for controlling the display panel. Further, the FPCB 300 can supply a control signal for controlling the touch screen panel via the sensing lines 230.

In this case, the FPCB 300 is implemented with a configuration in which an FPCB for driving the display panel and an FPCB for driving the touch screen panel are integrated with each other.

Thus, in this embodiment, the bonding and testing process of the FPCB 300 is simplified, so that it is possible to facilitate manufacturing processes and to decrease product cost, as compared with a case where FPCBs for respectively driving the touch screen panel and the display panel are individually provided.

While certain inventive aspects have been described in connection with certain exemplary embodiments, it is to be understood that the invention is not limited to the disclosed embodiments, but, on the contrary, is intended to cover various modifications and equivalent arrangements.

What is claimed is:

1. A flat panel display with an integrated touch screen panel, comprising:
   a substrate having a pixel area in which a plurality of pixels are formed and the substrate having an area greater than the pixel area;
   a sealing thin film formed over the pixel area of the substrate so as to inhibit oxygen and moisture from infiltrating into the pixels and the sealing thin film having an area greater than the pixel area;
   a plurality of sensing cells, formed directly over a top surface of the sealing thin film to form a touch screen panel;
   a plurality of sensing lines arranged outside the pixel area; the sensing lines comprising a first portion and a second portion; and
   a flexible printed circuit board (FPCB) attached to one end of the substrate,
   wherein the sensing lines are formed directly over the top surface of the sealing thin film in the first portion and the sensing lines are formed directly over the substrate in the second portion and extend from an end of the sealing thin film directly to the substrate beyond an end of the sealing thin film and to the side of the pixel area so as to be electrically connected to the FPCB,
   wherein the sealing thin film is interposed between the pixel area and the plurality of sensing cells,
   wherein the end of the sealing thin film is formed to be inclined downwardly toward the FPCB and the sensing lines are formed to have a conforming incline to prevent the sensing lines passing over the end of the sealing thin film from being broken, and
   wherein each of the sensing lines extends from a sensing cell to the FPCB as a single connection.

2. The flat panel display according to claim 1, wherein a driving IC for driving the pixels is mounted on the substrate outside of the pixel area.

3. The flat panel display according to claim 2, wherein the driving IC is electrically connected to the FPCB.

4. The flat panel display according to claim 2, wherein the driving IC comprises a control circuit for controlling the touch screen panel.

5. The flat panel display according to claim 1, wherein the sealing thin film has a stacked structure of a plurality of organic and inorganic layers.

6. The flat panel display according to claim 5, wherein the sealing thin film is formed with a structure in which a first organic layer, a first inorganic layer, a second organic layer and a second inorganic layer are sequentially stacked.

7. The flat panel display according to claim 6, wherein the first and second organic layers are formed of a material selected from the group consisting of epoxy, acrylate and urethane acrylate.

8. The flat panel display according to claim 6, wherein the first and second inorganic layers are formed of a material selected from the group consisting of $Al_xO_y$ and $SixO_y$.

9. The flat panel display according to claim 1, wherein the sensing cells comprise a plurality of first sensing cells formed to be connected along each line in a first direction, and a plurality of second sensing cells alternately arranged not to be overlapped with the first sensing cells and formed to be connected along each line in a second direction substantially perpendicular to the first direction.

10. The flat panel display according to claim 9, wherein the first sensing cells are connected along each line in the first direction by first connection patterns, and the second sensing cells are connected along each line in the second direction by second connection patterns.

11. The flat panel display according to claim 10, wherein the first connection patterns are respectively patterned to have independent patterns in an upper or lower layer of the first sensing cells so that they are electrically connected to the first sensing cells at an upper or lower portion of the first sensing cells.

12. The flat panel display according to claim 1, wherein the sealing thin film comprises an inclined surface at the end thereof, wherein the sensing lines are formed over the inclined surface.

13. The flat panel display according to claim 1, wherein the sensing lines are formed over surfaces of the sealing thin film and the substrate, the surfaces facing the same direction.

* * * * *